O. SCHOTT.
VEHICLE WHEEL.
APPLICATION FILED MAY 24, 1909.

948,076.

Patented Feb. 1, 1910.

Witnesses.
R. B. Gurley.
K. Smith.

Inventor
Oscar Schott
per
Wm. Hubbell Fisher
Attorney

UNITED STATES PATENT OFFICE.

OSCAR SCHOTT, OF CINCINNATI, OHIO.

VEHICLE-WHEEL.

948,076.  Specification of Letters Patent.  Patented Feb. 1, 1910.

Application filed May 24, 1909.  Serial No. 497,987.

*To all whom it may concern:*

Be it known that I, OSCAR SCHOTT, a citizen of the United States, and a resident of the city of Cincinnati, in the county of Hamilton and State of Ohio, have invented certain new and useful Improvements in Vehicle-Wheels, of which the following is a specification.

My invention relates to the improvement of the spoke of the wheel at and in the vicinity of the hub.

One of the principal objects of my invention is to provide a spoke that when combined with other spokes of like construction, shall constitute a structure from which no spoke can be withdrawn in the direction of its length; and which spokes shall never become loose, and weaken the wheel.

Another principal object of my invention is to provide a simple and strong hub, the wood of which is formed from the combination of these wooden spokes, and which reinforced by the hub flanges or plates shall be not only strong, but durable.

Another object of my invention is economy of manufacture.

The several features of my invention and the various advantages resulting from their use conjointly or otherwise will be apparent from the following description and claims.

Figure 1:
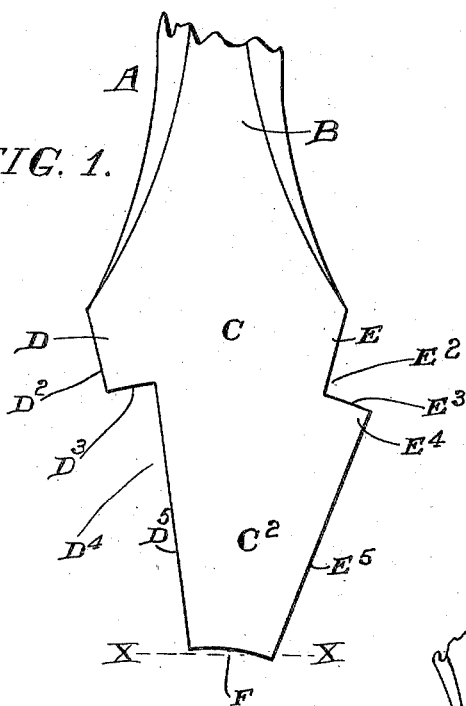
Figure 2:
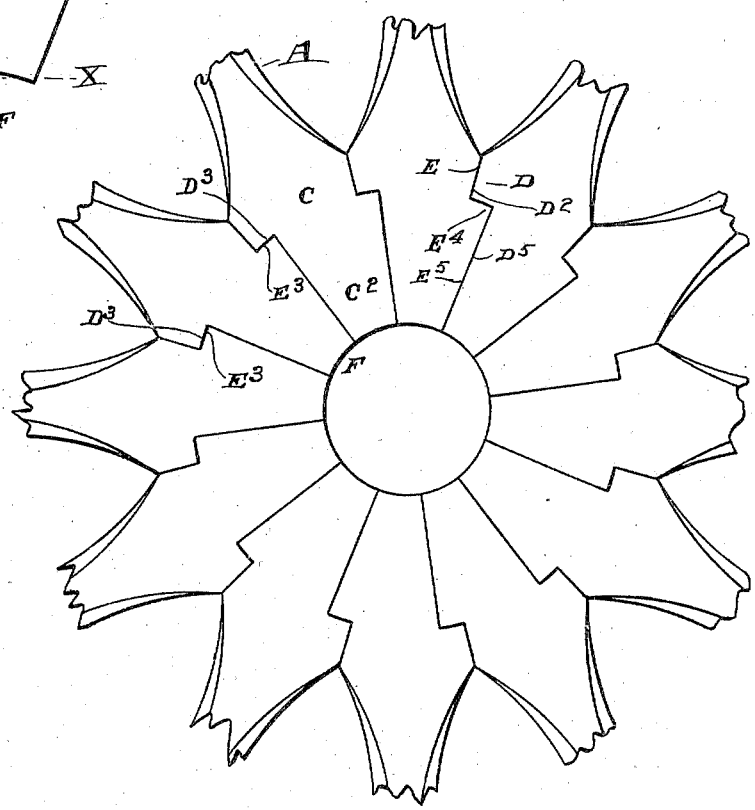

In the accompanying drawings making a part of this specification, and in which similar characters of reference indicate corresponding parts,—Figure 1 is a side elevation of the spoke embodying a feature of my invention. Fig. 2 is an elevation of a series of said spokes combined in a wheel.

I will now proceed to describe my invention in detail.

A indicates any one of the spokes. The spokes are preferably made alike. The main portion B of the spoke may be rounded or be square or many sided, in cross section. The lower end portion C of the spoke is enlarged. The front face $C^2$ and the rear face $C^2$ of this enlargement C are flat. On one edge of this enlarged portion, the wood is cut away toward the axis of the spoke, thus forming the shoulder D, and the edge $D^2$, and the edge $D^3$. A recess $D^4$ is thus formed below the edge $D^3$ of the shoulder D, and extending from said edge $D^3$ to where the axle box begins, namely: at the dotted line $x$, $x$.

The long edge of the recess I have indicated by the character $D^5$. The edge $D^2$ and the edge $D^5$ are respectively coincident with radial planes of the wheel, but the edge $D^3$ is at right angles to the radial axis of the spoke. On the opposite edge of the enlarged portion C, I form a notch or recess $E^2$. This recess is preferably at the upper portion of the enlargement C. One edge E of this enlargement is parallel to the radii of the wheel. This recess forms the shoulder $E^4$. Below this shoulder $E^4$ and as far as where the axle box is, namely: at the dotted line $x$, $x$, extends the straight edge $E^5$, also coincident with a radius of a circle. But the edge $E^3$ of the plane of the recess $E^2$ is at right angles to the plane of the edge $E^5$. The aforementioned edges are all of the thickness of a given spoke.

The bottom end F of the spoke is concaved to fit the axle box. The spokes thus shaped and formed are put together substantially as indicated in Fig. 2. When the last spoke of the wheel is to be put in position, it must be put in sidewise, and when put into place, it locks the entire circle of spokes. No spoke can then be withdrawn. Every spoke is tight and resists a pull upon it in a direction away from the center of the wheel. Metallic hub-bands are respectively located against the respective two opposite faces of this combination of spokes. The spokes are thus held firmly in position.

What I claim as new and of my invention and desire to secure by Letters Patent, is:—

1. A spoke, having in its enlarged portion next to the hub and in one edge a shoulder D, a long recess $D^4$, extending from the said shoulder to the hub box, the long edge of this recess and the edge $D^2$ beyond the shoulder edge $D^3$ being coincident with the radii of a circle, while that edge $D^3$ of the shoulder next to the long edge $D^5$ is substantially at right angles to the axis of the spoke, the spoke having on its other edge a recess $E^2$ in the enlarged portion C and near the spoke portion B, thus forming the edge E parallel to a radius of the wheel and an edge $E^3$ at right angles thereto, the long edge $E^5$ extending from the shoulder $E^4$, $E^3$, formed by the recess $E^2$, being coincident with the radius of a circle.

2. In combination, a circle of spokes fitted together as a part of a hub, each spoke having in its enlarged portion next to the hub and in one edge a shoulder D, a long recess $D^4$, extending from the said shoulder to the hub box, the long edge of this recess and the edge $D^2$ beyond the shoulder edge $D^3$ being coincident with the radii of a circle, while that edge $D^3$ of the shoulder next to the long edge $D^5$ is substantially at right angles to the axis of the spoke, the spoke having on its other edge a recess $E^2$ in the enlarged portion C and near the spoke portion B, thus forming the edge E parallel to a radius of the wheel and an edge $E^3$ at right angles thereto, the long edge $E^5$ extending from the shoulder $E^4$, $E^3$, formed by the recess $E^2$, being coincident with the radius of a circle.

OSCAR SCHOTT.

Attest:
H. E. ENGELHARDT,
K. SMITH.